Figure 6:
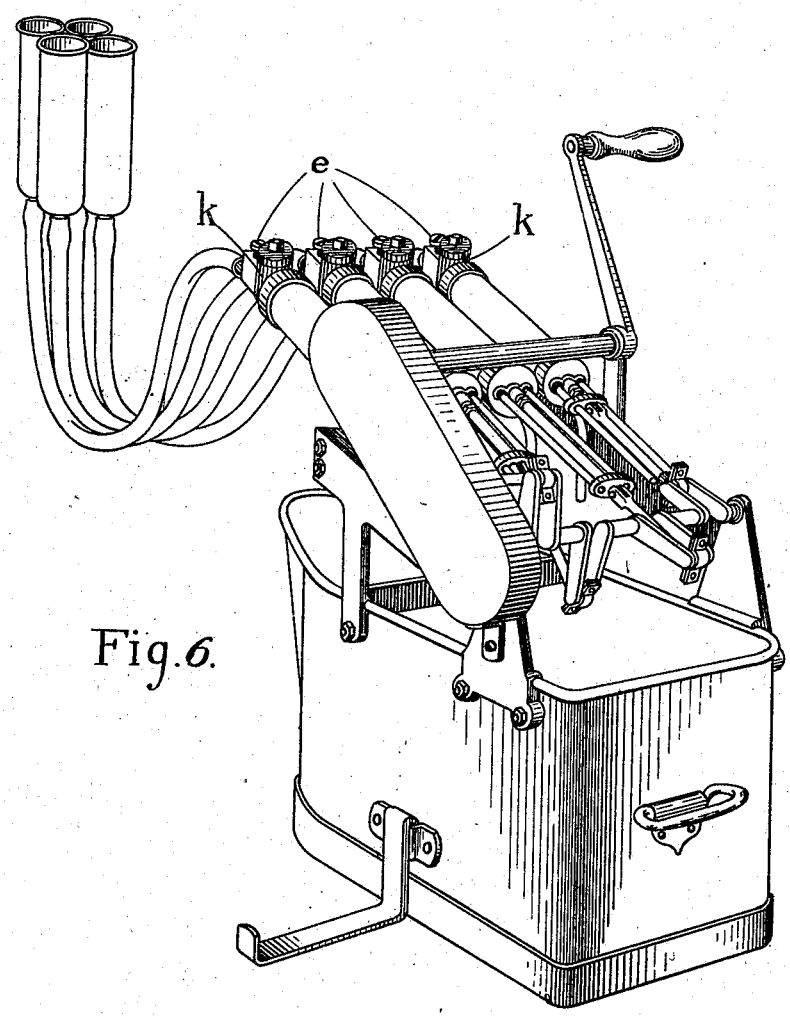

No. 840,510. PATENTED JAN. 8, 1907.
H. P. D. OHLHAVER.
MILKING MACHINE.
APPLICATION FILED JUNE 11, 1906.
3 SHEETS—SHEET 1.
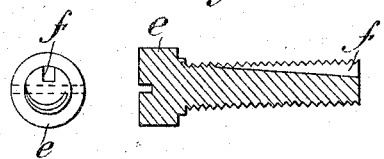
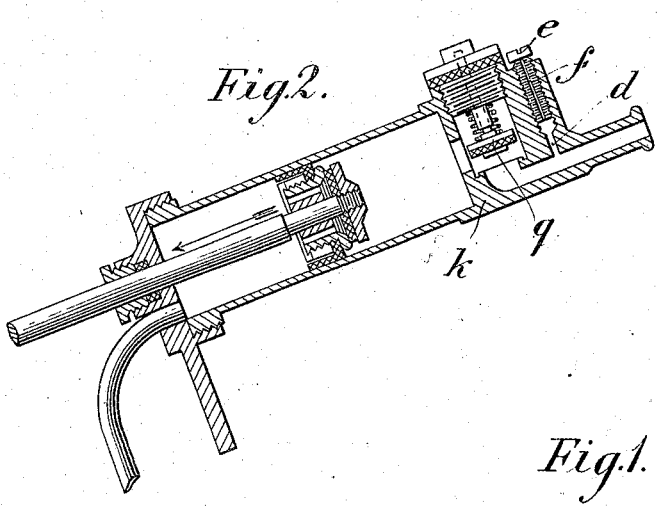
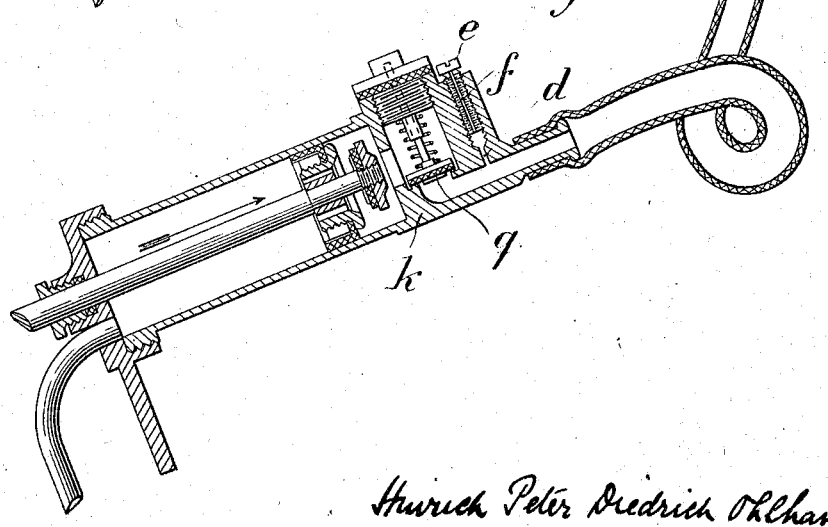

No. 840,510. PATENTED JAN. 8, 1907.
H. P. D. OHLHAVER.
MILKING MACHINE.
APPLICATION FILED JUNE 11, 1906.
3 SHEETS—SHEET 2.
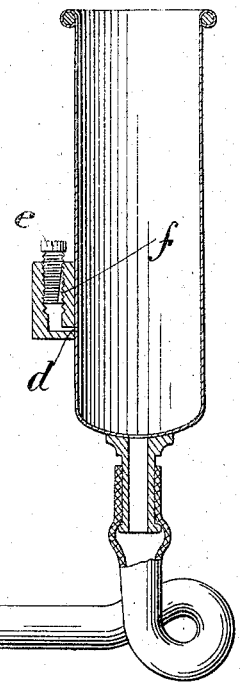
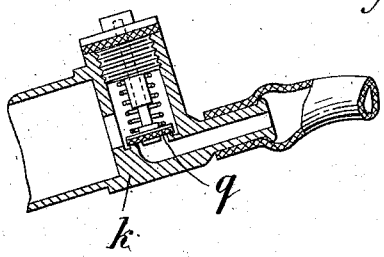
Fig. 4.
Fig. 5.
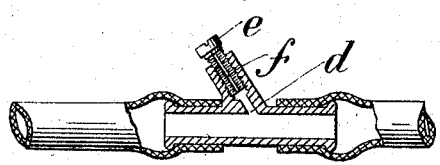
-Witnesses-
Arthur H. Rheinlander.
Arthur Gummer
-Inventor.-
Hinrich P. D. Ohlhaver
By Sydney E. Page
Attorney No. 840,510. PATENTED JAN. 8, 1907.
H. P. D. OHLHAVER.
MILKING MACHINE.
APPLICATION FILED JUNE 11, 1906.

3 SHEETS—SHEET 3.

UNITED STATES PATENT OFFICE.

HINRICH PETER DIEDRICH OHLHAVER, OF SAUDE, NEAR BERGEDORF, GERMANY.

MILKING-MACHINE.

No. 840,510.　　　　Specification of Letters Patent.　　　　Patented Jan. 8, 1907.

Application filed June 11, 1906. Serial No. 321,172.

*To all whom it may concern:*

Be it known that I, HINRICH PETER DIEDRICH OHLHAVER, a subject of the Emperor of Germany, residing at Saude, near Bergedorf, in the Kingdom of Prussia, Germany, have invented certain new and useful Improvements in Milking-Machines, of which the following is a specification.

This invention relates to improvements in the construction of milking-machines in which a separate pump and suction-passage is used for each teat of the animal being milked.

Such machines hitherto have been provided with an air-passage containing a regulating-valve, which passage has connected together the spaces on each side of the non-return valve, so that air could pass from the pump side of the non-return valve to relieve the vacuum in the suction-passage. Since, however, during the suction-stroke of the pump this air-passage formed a supplementary inlet for the milk to the pump, it was found that sooner or later the whole object of the valve was completely frustrated by the deposit of milk sediments on the valve-face, which blocked up the passage. As soon as this happened the whole machine was useless as leading to danger to the animal and the impossibility of milking her on account of the pain caused by the excessive suction.

The object of this invention is to provide a suction-regulating device on machines of the character described which shall be easy of manipulation, capable of accurate adjustment over a considerable range of pressure, and especially which shall not get out of order from the causes above set out. These objects are attained by the mechanism illustrated in the accompanying drawings, in which—

Figure 1 is a view of one of the pumps in section, showing the position of the valves with the piston on its inward stroke. Fig. 2 shows the same pump with its piston on its outward stroke. Fig. 3 is an enlarged view of the air-regulating device, and Figs. 4 and 5 show the air-regulating device in Fig. 1 applied to other parts of the passage between the teat and the non-return valve. Fig. 6 shows a complete machine having four pumps, each one connected separately to one teat.

Since no machine of this class is of any use without means for permanently adjusting the suction effect, having no risk of its changing after continued use, it is of the utmost importance that nothing but the air required should pass through the passage or orifice, and this method consists in constructing the suction-regulating device so that one end of the passage is always open to the outside atmosphere and the other end thereof is connected to the suction-passage somewhere between the non-return valve and the teat of the animal. By this means—after the pump is fully at work—since the suction-passage is always under the influence of a partial vacuum no milk will tend to pass out through the air-passage, while air will always tend to enter therethrough. Only a very small orifice is allowable, and if it could be accurately gaged a simple orifice would be sufficient; but since it is also of essential importance in this class of machine that the vacuum should be kept within certain limits and may have to be varied for different animals it is preferable to provide a device capable of regulating the size of the inlet with great nicety in proportion to the volume of the pump and other conditions.

As before mentioned, there is a separate pump and accessories to each teat—being four pumps for a cow—and these may be driven by any ordinary means that is suitable for the purpose, such as that shown in Fig. 6.

Referring to Fig. 1, it will be seen that an air-passage $d$ is formed in a lug on the valve-box $k$ and is provided with a screw $e$, having cut along one side thereof the slot $f$. This slot, as shown in Fig. 3, is deep at the end and tapers up to nothing, and being a fine thread on the screw $e$ one turn of the screw makes but a very small difference in the size of the air-orifice. It will further be seen that the opening $d$ being into the passage between the valve $q$ and the teat it is always admitting air to a partial vacuum, and no milk will tend to exude therethrough no matter in which direction the piston is moving.

Fig. 4 shows the regulating device (as in Fig. 3) applied directly to the teat-cup, and Fig. 5 shows the same device applied to a socket in the connecting-pipe. In both these cases the regulation is obtained in the same way, and the question of position is merely one of convenience.

I am aware that prior to my invention milking-machines have been made, as before mentioned, with an air-passage and a regulating-valve operating in conjunction with a non-return valve and with a separate pump to each teat. I therefore do not claim such a combination broadly; but What I do claim as my invention, and desire to secure by Letters Patent, is—

1. In a milking-machine, the combination with a multiple-suction pump having a separate barrel, outlet-tube, suction-passage, and teat-cup, to each teat of the animal, of a non-return valve interposed between the pump and the suction-passage, and an air-regulating passage, or orifice, connecting the suction-passage between the non-return valve and the teat with the external air, so that the milk will not exude therethrough owing to the vacuum in the suction-passage.

2. In a milking-machine, the combination with a multiple-suction pump having a separate barrel, outlet-tube, suction-passage, and teat-cup, to each teat of the animal, of a non-return valve interposed between the pump and the suction-passage, an air-regulating passage connecting the suction-passage between the non-return valve and the teat with the external air, and means for regulating the size of the said passage so that the suction effect can be regulated without the milk coming into contact with the regulating means.

3. In a milking-machine, the combination with a multiple-suction pump having a separate barrel, outlet-tube, suction-passage, and teat-cup, to each teat of the animal, of a non-return valve interposed between the pump and the suction-passage, an air-regulating passage connecting the suction-passage between the non-return valve and the teat with the external air, a regulating-screw adjustable in the said passage, and a tapered slot on the side of the regulating-screw whereby the size of the passage can be varied and the suction regulated for each teat, substantially as described.

In testimony whereof I have affixed my signature in presence of two witnesses.

HINRICH PETER DIEDRICH OHLHAVER.

Witnesses:
OTTO W. HELLMRICH,
IDA CHRIST. HAFERMANN.